(12) United States Patent
Shimshock et al.

(10) Patent No.: US 12,332,878 B1
(45) Date of Patent: Jun. 17, 2025

(54) SECURE CROSS-PLATFORM ORCHESTRATION AND KNOWLEDGE MANAGEMENT OF MACHINE-LEARNING MODELS

(71) Applicant: Mill Pond Research LLC, Reno, NV (US)

(72) Inventors: Andrew Shimshock, San Carlos, CA (US); Peter Shimshock, Reno, NV (US); Christopher Caen, San Francisco, CA (US)

(73) Assignee: Mill Pond Research LLC, Reno, NV (US)

( * ) Notice: Subject to any disclaimer, the term of this patent is extended or adjusted under 35 U.S.C. 154(b) by 0 days.

(21) Appl. No.: 19/076,782

(22) Filed: Mar. 11, 2025

(51) Int. Cl.
G06F 16/24 (2019.01)
G06F 16/242 (2019.01)
G06F 16/245 (2019.01)
G06F 16/2453 (2019.01)

(52) U.S. Cl.
CPC ...... *G06F 16/243* (2019.01); *G06F 16/24535* (2019.01)

(58) Field of Classification Search
None
See application file for complete search history.

(56) References Cited

U.S. PATENT DOCUMENTS

| | | | |
|---|---|---|---|
| 7,840,547 B1 * | 11/2010 | Tucker | G06F 16/9535 707/706 |
| 10,540,661 B2 | 1/2020 | Lange et al. | |
| 10,672,251 B1 | 6/2020 | Krayer et al. | |
| 10,922,493 B1 | 2/2021 | Das et al. | |
| 11,010,284 B1 | 5/2021 | Santiago et al. | |
| 11,023,461 B2 | 6/2021 | Rumiantsau et al. | |
| 11,232,365 B2 | 1/2022 | Sundararaman et al. | |

(Continued)

OTHER PUBLICATIONS

Rajput, M. (Jul. 28, 2024). "LLM Cache: The Secret Weapon You're Overlooking," located at https://mrmaheshrajput.medium.com/llm-cache-the-secret-weapon-youre-overlooking-a26b6ddab7cc. (19 pages).

(Continued)

*Primary Examiner* — Son T Hoang
(74) *Attorney, Agent, or Firm* — Morrison & Foerster LLP (57) ABSTRACT

An exemplary machine-learning-based method for generating a response to a natural-language query from an entity associated with an organization comprises: obtaining a sub-query from the natural-language query; determining if a cache associated with the organization stores a matching historical sub-query: if the cache stores the matching historical sub-query, retrieving a historical sub-response associated with the historical sub-query from the cache as a sub-query response; if the cache does not store any matching historical sub-query: inputting the sub-query into a cache-based enhancement machine-learning model to enhance the sub-query, wherein the cache-based enhancement machine-learning model is trained based on historical query data stored in the cache associated with the organization; and inputting the enhanced sub-query into a language model to generate the sub-query response; and generating the response to the natural-language query based on the sub-query response.

20 Claims, 7 Drawing Sheets

(56) References Cited

U.S. PATENT DOCUMENTS

| | | | |
|---|---|---|---|
| 11,593,364 B2 | 2/2023 | Nahamoo et al. | |
| 11,790,898 B1 | 10/2023 | Teng et al. | |
| 12,165,426 B2 | 12/2024 | Marcheret et al. | |
| 12,182,111 B1 | 12/2024 | Tca et al. | |
| 12,197,478 B1 | 1/2025 | Mansour et al. | |
| 2005/0043940 A1 | 2/2005 | Elder | |
| 2014/0310232 A1* | 10/2014 | Plattner | G06F 16/24539 707/602 |
| 2015/0012469 A1* | 1/2015 | Zacharia | G06F 16/243 |
| 2020/0133254 A1 | 4/2020 | Cella et al. | |
| 2024/0176793 A1* | 5/2024 | Bronnikov | G06F 16/283 |
| 2024/0386015 A1 | 11/2024 | Crabtree et al. | |
| 2024/0394251 A1 | 11/2024 | Brende et al. | |
| 2025/0021652 A1* | 1/2025 | Liljenstam | G06F 16/95 |
| 2025/0103625 A1* | 3/2025 | Addanki | G06F 16/3326 |

OTHER PUBLICATIONS

Romero et al. (May 7, 2024). "Semantic Cache: Accelerating AI with Lightning-Fast Data Retrieval," located at https://qdrant.tech/articles/semantic-cache-ai-data-retrieval/#. (5 pages).

* cited by examiner

Agent Role-based

Original Query:
*Help me to initiate Q4 2024.*

Enhanced Query:
*I am a financial controller assistant at IBM. Help me to initiate Q4 2024. <u>List all key metric details I must include in Q4 2024.</u>*

Cache-based

Enhanced Query:
*I am a financial controller assistant at IBM. Help me to initiate Q4 2024. List all key metric details I must include in Q4 2024: <u>Revenue, Operating Expenses, Gross Profit & Gross Margin, Net Income, EBITDA, Cash Flow, QoQ Growth, ROA and ROE of IBM 2024.</u>*

Company Proprietary Knowledge-based

Final Query:
*I am a financial controller assistant at IBM. Help me to initiate Q4 2024. List all key metric details I must include in Q4 2024: Revenue, Operating Expenses, Gross Profit & Gross Margin, Net Income, EBITDA, Cash Flow, QoQ Growth, ROA and ROE of IBM 2024.*

*<u>Note that IBM has its unique reporting style for Q4 like: <Document-1></u>*
*<u>And the template document is like: <Document-2></u>*

SECURE CROSS-PLATFORM ORCHESTRATION AND KNOWLEDGE MANAGEMENT OF MACHINE-LEARNING MODELS

FIELD

The present disclosure relates generally to machine-learning techniques, and more specifically to systems and methods for secure and intelligent orchestration of machine-learning models across multiple platforms. The system is designed to address the challenges organizations face in managing the complexities of interacting with diverse machine-learning models while ensuring data security, compliance, and operational efficiency.

BACKGROUND

With the proliferation of machine-learning models such as large language models (LLMs) and their increasing adoption in enterprise environments, organizations face challenges in managing the secure and efficient utilization of these AI systems. For example, within an enterprise or organization, a large volume of identical or similar queries may be submitted by users. Different accountants in a company, for instance, may ask for the company's financial information at different times throughout the year. The computational resource needed to route and process each given query can be significant and the use of external LLMs to obtain a response can be costly. Further, different LLM providers offer varying capabilities, APIs, and security features, making it difficult to enforce consistent policies and maintain a unified knowledge repository across platforms.

Thus, there is a need for a system that can orchestrate interactions with multiple LLMs, apply organization-specific rules and restrictions, and leverage historical data to improve the performance of AI agents over time.

SUMMARY

Disclosed herein are systems, electronic devices, methods, non-transitory storage media, and apparatuses for generating a response to a natural-language query from an entity associated with an organization. An exemplary system can obtain a sub-query from the natural-language query and determine if a cache associated with the organization stores a matching historical sub-query. If the cache stores the matching historical sub-query, the system can retrieve a historical sub-response associated with the historical sub-query from the cache as a sub-query response. If the cache does not store any matching historical sub-query, the system can input the sub-query into a cache-based enhancement machine-learning model to enhance the sub-query and input the enhanced sub-query into a language model to generate the sub-query response. The cache-based enhancement machine-learning model is trained based on historical query data stored in the cache associated with the organization. The system can generate the response to the natural-language query based on the sub-query response.

Embodiments of the present disclosure can enable secure and efficient orchestration of multiple language models across platforms, with integrated knowledge management capabilities. The system can provide a comprehensive middleware solution that allows organizations to define and enforce query routing rules, sensitive information restrictions, and logging functionalities across disparate language model providers. The system can include a dynamic cache that continuously learns from user interactions, enhancing the accuracy and performance of AI agents over time.

Embodiments of the present disclosure can address the challenges organizations face in managing the secure and efficient utilization of large language models (LLMs), such as enforcing consistent policies and maintaining a unified knowledge repository across platforms. The system's modular architecture includes key components such as an API gateway, a rules engine, a cache, a knowledge base, a model manager, and logging and analytics modules. These components work together to enable a unique workflow where incoming queries are processed through customizable rules, checked against the cache for relevant historical responses, and routed to the appropriate LLM provider if needed. The generated responses can be logged and fed back into the cache, ensuring continuous improvement and reduced reliance on external APIs.

By providing a unified interface for managing multiple LLMs, advanced rule-based query processing, intelligent response retrieval from the cache, and comprehensive logging and analytics functionalities, the system can empower organizations to harness the power of language models while maintaining data security, compliance, and operational efficiency. The system's ability to learn and adapt over time, combined with its flexible architecture and extensibility, make it a valuable tool for building secure, intelligent, and scalable natural language processing solutions across a wide range of industries and use cases. The workflow ensures that organizational policies and security requirements are consistently enforced across multiple LLM platforms, while the integrated knowledge base and cache enable the system to learn and improve over time, reducing reliance on external APIs and associated costs.

The system can receive and handle queries associated with a variety of industries such as healthcare, finance, e-commerce, and customer service. For example, in the healthcare domain, the system can be used to build intelligent chat assistants that provide personalized medical advice based on patient queries, while ensuring compliance with strict data privacy regulations such as HIPAA. The system's ability to learn from historical interactions and apply domain-specific rules can significantly improve the accuracy and relevance of responses, leading to better patient outcomes and reduced workload for healthcare professionals. In the financial industry, the system can power advanced customer support systems that handle a wide range of financial queries, from account inquiries to investment advice. The system's rule engine can be configured to enforce strict security policies, such as masking sensitive account information and routing queries based on user authentication levels. The cache component can store and retrieve frequently asked questions and their answers, enabling quick resolution of common queries and freeing up human agents to handle more complex issues. In the realm of customer service, the system can revolutionize the way organizations handle customer inquiries and support requests. By integrating with existing customer support platforms, the system can automatically route queries to the most appropriate language model based on the nature of the request, ensuring fast and accurate responses. The system's knowledge base and cache can store and retrieve common troubleshooting steps, product information, and service level agreements, enabling self-service options for customers. The system can adapt and incorporate new advancements in language modeling techniques and architectures. The system's modular design and extensible plugin architecture allow for seamless integration of future language models and processing capabilities, ensuring that organizations can stay at the forefront of machine-learning technology.

As used herein, a language model may be a small language model (SLM) or a large language model (LLM). A language model is a machine-learning model capable of processing, understanding, and generating natural language content. SLMs may be smaller in scale and scope than LLMs, for example, by having a smaller number of parameters (a few million to a few billion, as opposed to hundreds of billions or trillions). In some embodiments, the language model can comprise a neural network-based architecture such as the transformer model.

An exemplary machine-learning-based method for generating a response to a natural-language query from an entity associated with an organization comprises: obtaining a sub-query from the natural-language query; determining if a cache associated with the organization stores a matching historical sub-query: if the cache stores the matching historical sub-query, retrieving a historical sub-response associated with the historical sub-query from the cache as a sub-query response; if the cache does not store any matching historical sub-query: inputting the sub-query into a cache-based enhancement machine-learning model to enhance the sub-query, wherein the cache-based enhancement machine-learning model is trained based on historical query data stored in the cache associated with the organization; and inputting the enhanced sub-query into a language model to generate the sub-query response; and generating the response to the natural-language query based on the sub-query response.

In some embodiments, the method further comprises storing the sub-query and the sub-query response as additional historical data in the cache associated with the organization.

In some embodiments, the method further comprises retraining the cache-based enhancement machine-learning model based on at least partially the additional historical data in the cache.

In some embodiments, the method further comprises training one or more organization-specific large language models based on at least partially the additional historical data in the cache.

In some embodiments, the method further comprises receiving the natural-language query; checking, based on one or more organization-specific rules, whether the natural-language query is permissible; and if the natural-language query is not permissible, foregoing generating the response to a natural-language query. In some embodiments, the method further comprises checking, based on the one or more organization-specific rules, if the natural-language query includes sensitive information; and if the natural-language query contains sensitive information, masking the sensitive information in the natural-language query.

In some embodiments, the method further comprises decomposing, using a query decomposition machine-learning model, the natural-language query into a plurality of sub-queries. The query decomposition machine-learning model may comprise a small language model. Generating the response to the natural-language query may comprise combining a plurality of sub-query responses corresponding to the plurality of sub-queries.

In some embodiments, determining if the cache associated with the organization stores a matching historical sub-query comprises: retrieving one or more candidate historical sub-queries from the cache based on information related to the entity.

In some embodiments, the method further comprises adding information related to the entity to the sub-query. The information related to the entity can comprise: a role, a title, a department, a place of employment, or any combination thereof.

In some embodiments, the method further comprises adding information related to the organization to the sub-query. The information related to the organization can comprise one or more documents from a confidential knowledge base associated with the organization.

In some embodiments, the method further comprises selecting the language model from a plurality of candidate language models based on the enhanced sub-query. Selecting the language model from the plurality of candidate language models can comprise: inputting the enhanced sub-query into a query classifier. The query classifier can be a small language model. The query classifier can be trained based on one or more natural-language rules provided by an administrator of the organization.

An exemplary system for generating a response to a natural-language query from an entity associated with an organization comprises: one or more processors; a memory; and one or more programs, wherein the one or more programs are stored in the memory and configured to be executed by the one or more processors, the one or more programs including instructions for: obtaining a sub-query from the natural-language query; determining if a cache associated with the organization stores a matching historical sub-query: if the cache stores the matching historical sub-query, retrieving a historical sub-response associated with the historical sub-query from the cache as a sub-query response; if the cache does not store any matching historical sub-query: inputting the sub-query into a cache-based enhancement machine-learning model to enhance the sub-query, wherein the cache-based enhancement machine-learning model is trained based on historical query data stored in the cache associated with the organization; and inputting the enhanced sub-query into a language model to generate the sub-query response; and generating the response to the natural-language query based on the sub-query response.

An exemplary non-transitory computer-readable storage medium stores one or more programs, the one or more programs comprising instructions, which when executed by one or more processors of one or more electronic devices, cause the one or more electronic devices to: obtain a sub-query from the natural-language query; determine if a cache associated with the organization stores a matching historical sub-query: if the cache stores the matching historical sub-query, retrieving a historical sub-response associated with the historical sub-query from the cache as a sub-query response; if the cache does not store any matching historical sub-query: inputting the sub-query into a cache-based enhancement machine-learning model to enhance the sub-query, wherein the cache-based enhancement machine-learning model is trained based on historical query data stored in the cache associated with the organization; and inputting the enhanced sub-query into a language model to generate the sub-query response; and generate the response to the natural-language query based on the sub-query response.

DETAILED DESCRIPTION

Disclosed herein are systems, electronic devices, methods, non-transitory storage media, and apparatuses for generating a response to a natural-language query from an entity associated with an organization. An exemplary system can obtain a sub-query from the natural-language query and determine if a cache associated with the organization stores a matching historical sub-query. If the cache stores the matching historical sub-query, the system can retrieve a historical sub-response associated with the historical sub-query from the cache as a sub-query response. If the cache does not store any matching historical sub-query, the system can input the sub-query into a cache-based enhancement machine-learning model to enhance the sub-query and input the enhanced sub-query into a language model to generate the sub-query response. The cache-based enhancement machine-learning model is trained based on historical query data stored in the cache associated with the organization. The system can generate the response to the natural-language query based on the sub-query response.

Embodiments of the present disclosure can enable secure and efficient orchestration of multiple language models across platforms, with integrated knowledge management capabilities. The system can provide a comprehensive middleware solution that allows organizations to define and enforce query routing rules, sensitive information restrictions, and logging functionalities across disparate language model providers. The system can include a dynamic cache that continuously learns from user interactions, enhancing the accuracy and performance of AI agents over time.

Embodiments of the present disclosure can address the challenges organizations face in managing the secure and efficient utilization of large language models (LLMs), such as enforcing consistent policies and maintaining a unified knowledge repository across platforms. The system's modular architecture includes key components such as an API gateway, a rules engine, a cache, a knowledge base, a model manager, and logging and analytics modules. These components work together to enable a unique workflow where incoming queries are processed through customizable rules, checked against the cache for relevant historical responses, and routed to the appropriate LLM provider if needed. The generated responses can be logged and fed back into the cache, ensuring continuous improvement and reduced reliance on external APIs.

By providing a unified interface for managing multiple LLMs, advanced rule-based query processing, intelligent response retrieval from the cache, and comprehensive logging and analytics functionalities, the system can empower organizations to harness the power of language models while maintaining data security, compliance, and operational efficiency. The system's ability to learn and adapt over time, combined with its flexible architecture and extensibility, make it a valuable tool for building secure, intelligent, and scalable natural language processing solutions across a wide range of industries and use cases. The workflow ensures that organizational policies and security requirements are consistently enforced across multiple LLM platforms, while the integrated knowledge base and cache enable the system to learn and improve over time, reducing reliance on external APIs and associated costs.

The system can receive and handle queries associated with a variety of industries such as healthcare, finance, e-commerce, and customer service. For example, in the healthcare domain, the system can be used to build intelligent chat assistants that provide personalized medical advice based on patient queries, while ensuring compliance with strict data privacy regulations such as HIPAA. The system's ability to learn from historical interactions and apply domain-specific rules can significantly improve the accuracy and relevance of responses, leading to better patient outcomes and reduced workload for healthcare professionals. In the financial industry, the system can power advanced customer support systems that handle a wide range of financial queries, from account inquiries to investment advice. The system's rule engine can be configured to enforce strict security policies, such as masking sensitive account information and routing queries based on user authentication levels. The cache component can store and retrieve frequently asked questions and their answers, enabling quick resolution of common queries and freeing up human agents to handle more complex issues. In the realm of customer service, the system can revolutionize the way organizations handle customer inquiries and support requests. By integrating with existing customer support platforms, the system can automatically route queries to the most appropriate language model based on the nature of the request, ensuring fast and accurate responses. The system's knowledge base and cache can store and retrieve common troubleshooting steps, product information, and service level agreements, enabling self-service options for customers. The system can adapt and incorporate new advancements in language modeling techniques and architectures. The system's modular design and extensible plugin architecture allow for seamless integration of future language models and processing capabilities, ensuring that organizations can stay at the forefront of machine-learning technology.

As used herein, a language model may be a small language model (SLM) or a large language model (LLM). A language model is a machine-learning model capable of processing, understanding, and generating natural language content. SLMs may be smaller in scale and scope than LLMs, for example, by having a smaller number of parameters (a few million to a few billion, as opposed to hundreds of billions or trillions). In some embodiments, the language model can comprise a neural network-based architecture such as the transformer model.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
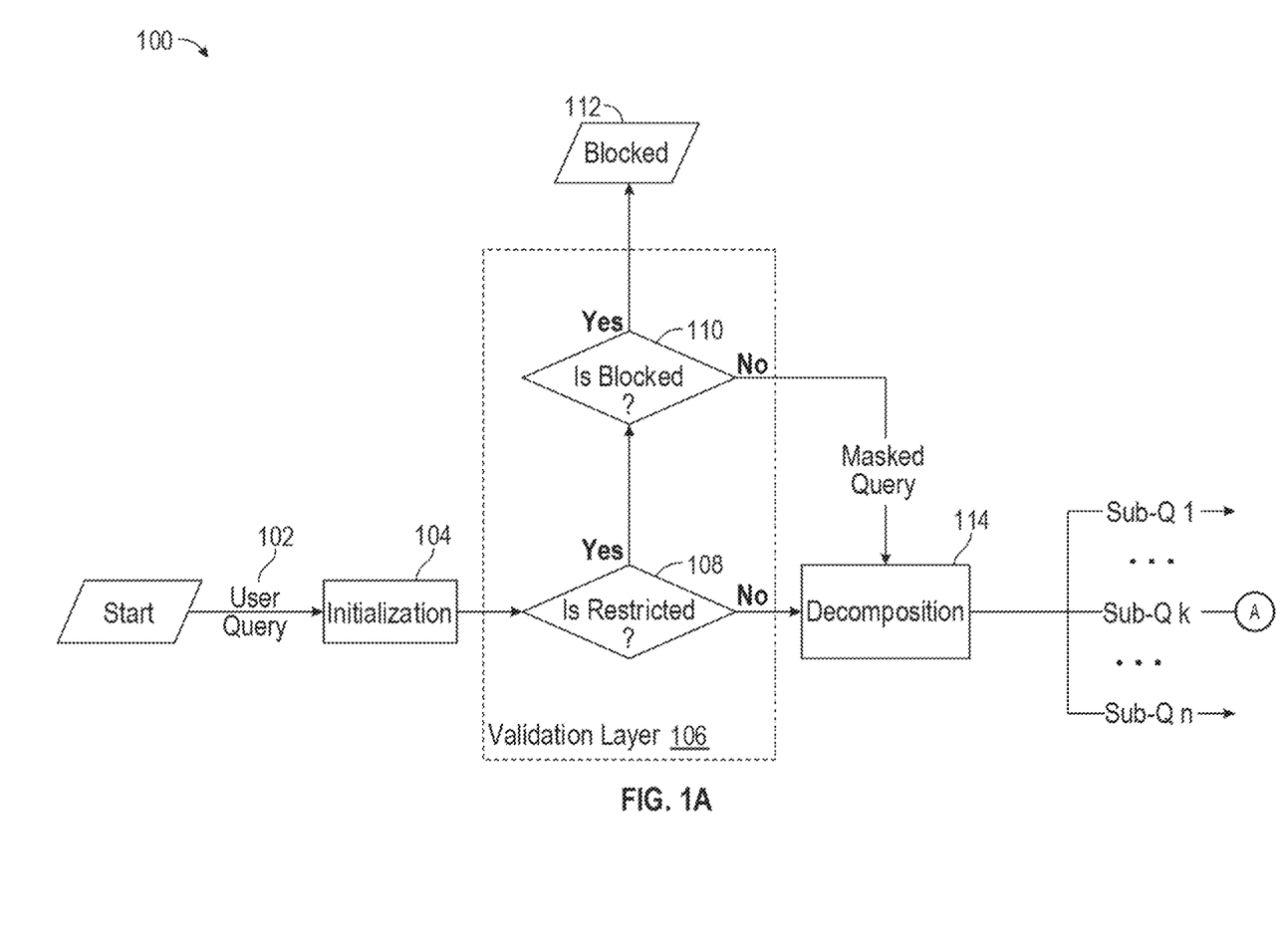
FIGS. 1A-1C illustrate an exemplary machine-learning-based process 100 for generating a response to a natural-language query from an entity associated with an organization, in accordance with some embodiments.
Figure 1B:
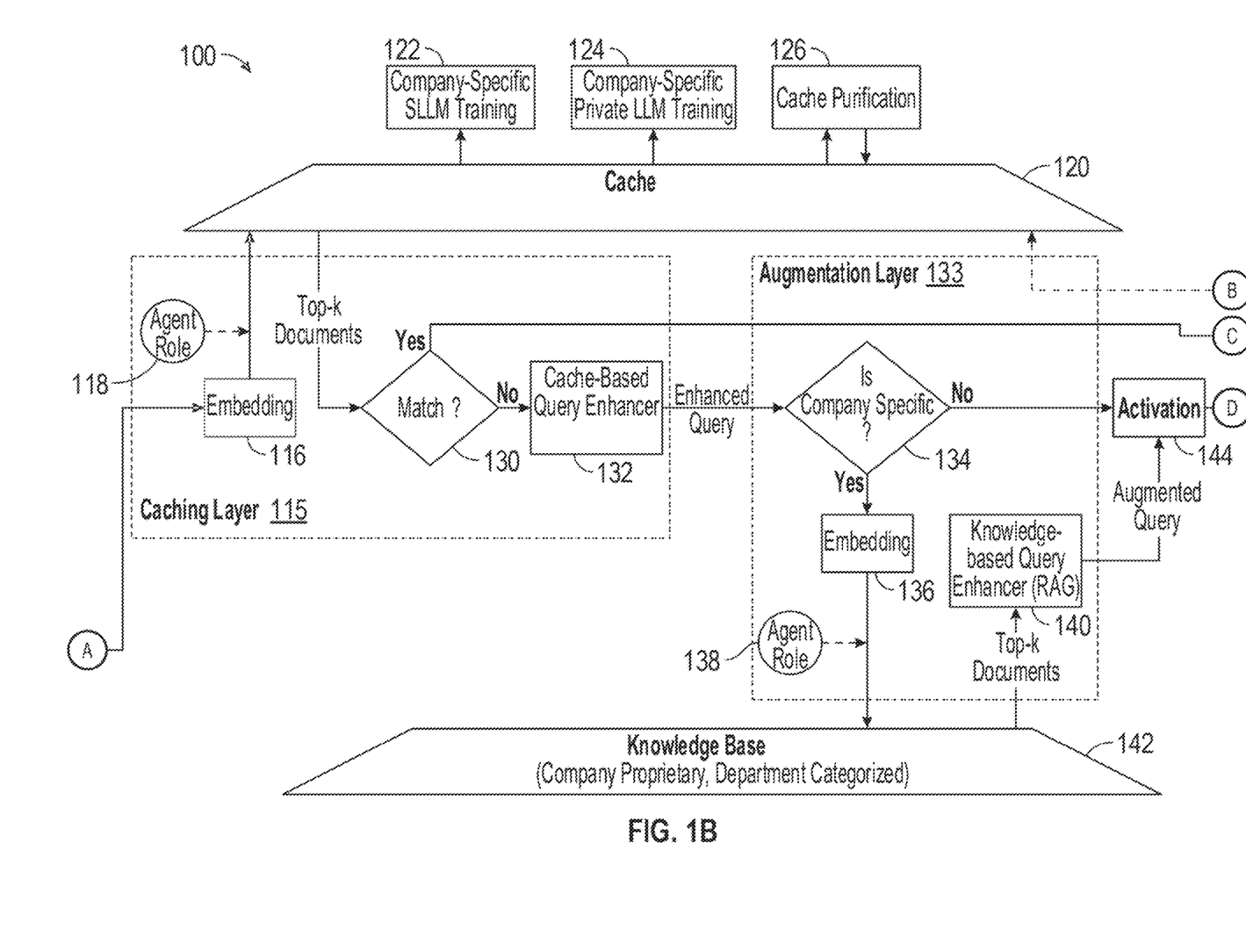
Figure 1C:
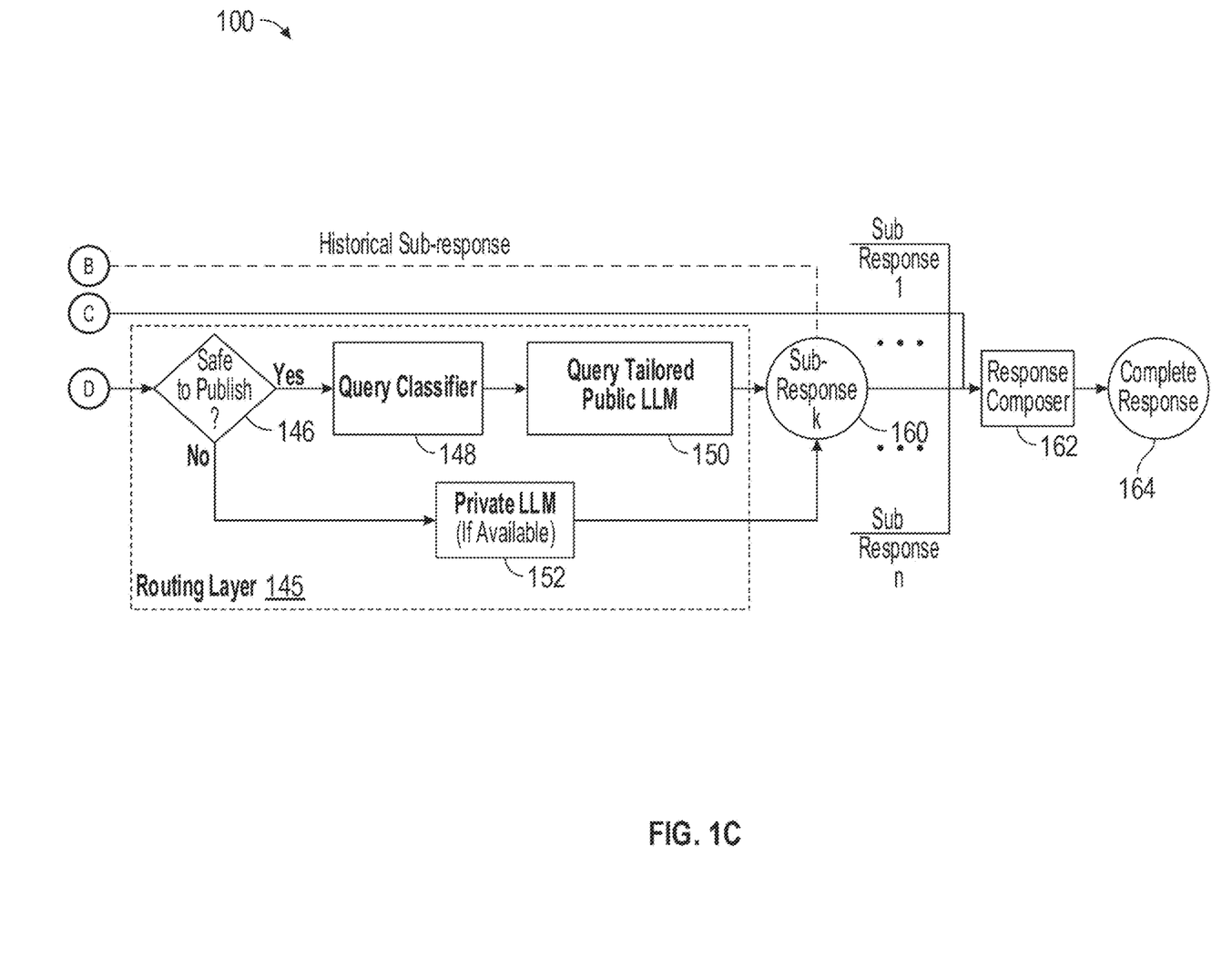

FIGS. 1A-C illustrate an exemplary machine-learning-based process 100 for generating a response to a natural-language query from an entity associated with an organization, in accordance with some embodiments. Process 100 is performed, for example, using one or more electronic devices implementing a software platform. In some examples, process 100 is performed using a client-server system, and the blocks of process 100 are divided up in any manner between the server and one or more client devices. Thus, while portions of process 100 are described herein as being performed by particular devices, it will be appreciated that process 100 is not so limited. In other examples, process 100 is performed using only a client device or only multiple client devices. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting.

With reference to FIG. 1A, an exemplary system (e.g., one or more electronic devices) receives a natural-language query 102 from an entity associated with an organization. The entity may be a person, such as an employee of a company, a user of a company's products or services, or the like. In some examples, the entity may be a computer program associated with the organization, such as an AI agent that can be accessed and used by a person associated with the organization. For example, the AI agent program may provide a user interface for an end user (e.g., a customer, employee, or administrator of an organization) to submit a natural-language query and provide the natural-language query (or a modified or augmented version thereof) to the system via an API gateway for further processing. In some embodiments, the system can authenticate a query request using secure authentication protocols.

Optionally, at block 104, the system can perform initialization based on the natural-language query 102. In some examples, the initialization can comprise tokenization of the natural-language query 102. The system can break down the raw query text into a sequence of tokens, which form the basic units for further processing. The system may perform any tokenization techniques (e.g., word-based, character-based, and custom token definitions), enabling organizations to tailor the tokenization process to their specific domain and language requirements. In some examples, the system can additionally apply various preprocessing techniques, such as lowercasing, punctuation removal, and stop word filtering, based on configurable options, ensuring consistent and efficient processing of queries.

The process 100 can comprise a validation layer 106, which includes blocks 108 and 110, for performing a preliminary check on the natural-language query 102 (or a tokenized version thereof) based on one or more organization-specific rules. The rules can be set by an administrator of the organization and can specify the types of information that need to be masked and the types of queries that are not permitted. For example, a rule can define a list of sensitive information, such as credit card information, financial data, email addresses, social security numbers, project code names, and the like. As another example, a rule can define a sensitive topic or certain keywords that would cause a query to be blocked. The rule can be user-specific or role-specific; for example, it may specify that a query to access certain data by a certain user or a certain role is to be blocked. At block 108, the system determines whether the query is restricted (e.g., contains sensitive information and/or needs to be blocked). If no, the process 100 proceeds to block 114. If yes, the process 100 proceeds to block 110, where the system determines whether the query needs to blocked. If yes, the process 100 proceeds to block 112 and terminates. If no (i.e., the query does not need to be blocked completely but contains sensitive information), the system can mask or anonymize sensitive information in the query (e.g., by removing or replacing the sensitive information using a rule-based logic or using a machine-learning model) and then proceed to block 114.

At block 114, the system decomposes the natural-language query 102 (or a tokenized and/or masked version thereof) into a plurality of sub-queries (also referred to as "atomic queries" herein). The query decomposition may be performed using a query decomposition machine-learning model. In some examples, the query decomposition machine-learning model is a language model configured to receive a text string and generate a plurality of sub-strings corresponding to a plurality of sub-queries. For example, the query decomposition machine-learning model may comprise a small language model, such as a LangChain decomposition model, the Phi-4 model, or the like. In some embodiments, to enhance decomposition performance, the language model can be fine-tuned for the specific task of query decomposition based on publicly available datasets for training, supervised by a larger language model, such as GPT vis distillation techniques. Query decomposition can be represented as the following task:

From given user query Q, the system can apply decomposition to get $Q_1, Q_2, \ldots Q_n$ satisfying $R(Q_1)+R(Q_2)+\ldots+R(Q_n)=R(Q)$ where R is an answering function to a question.

As shown in FIG. 1A, the natural language query 102 is broken into a plurality of sub-queries 1-n. In some embodiments (not depicted), the validation layer 106 may be provided after the plurality of sub-queries are generated to determine whether each sub-query should be blocked or masked. In some embodiments, a validation layer in addition to the validation layer 106 may be provided to determine whether each sub-query should be blocked or masked. Accordingly, the system may take a natural-language query that is only partially acceptable and, rather than blocking the entire query, block or modify the unacceptable sub-queries and allow the remaining and/or modified sub-queries to be processed to obtain a response. Further, for each sub-query, the enhancement and routing can be tailored for the specific sub-query, independent of other sub-queries in the query.

Turning to FIG. 1B, the process 100 further includes a caching layer 115, which leverages an organization-specific cache 120 to either provide a response for a given sub-query or enhance the sub-query before passing it to a language model. The organization-specific cache 120 comprises one or more databases storing a plurality of data pairs, each data pair comprising a historical sub-query and a historical sub-response. The historical sub-queries may be sub-queries previously received and processed by the system and the historical sub-responses may be the sub-responses previously generated by the system corresponding to the historical subqueries.

In the caching layer 115, the system determines if the organization-specific cache 120 stores a matching historical sub-query for the sub-query k. In the depicted example, the system may retrieve a list of top matching sub-queries (depicted as top-k documents in FIG. 1B) with the highest degree of matching with the sub-query k. At block 130, the system determines, from the retrieved historical sub-queries, whether there is a matching historical sub-query (e.g., with a similarity exceeding a predefined threshold). In some embodiments, semantic similarity matching techniques, such as TF-IDF or N-grams, can be used to calculate the similarity of historical sub-queries to the current sub-query.

Optionally, to facilitate lookup and retrieval of historical sub-queries, the sub-query k is transformed into one or more embeddings. Embeddings are vector representations of data and may be used to represent the key information of sub-query k in a lower-dimensional manner. In some embodiments, the system inputs the sub-query k into an embedding machine-learning model, which is configured to output one or more embeddings 116 representing the sub-query k. Further, the cache 120 can store historical embeddings representing various historical sub-queries, in addition to or instead of storing the raw text strings. Accordingly, the system can retrieve historical embeddings from the cache 120 that best match the embeddings 116 (e.g., embedding similarity metric exceeding a threshold, top n best matching historical embeddings). At block 130, the system determines, from the retrieve historical embeddings, whether there is a matching historical sub-query (e.g., with an embedding similarity metric exceeding a threshold, or an exact match). Storing the historical embeddings can require significantly less storage. Further, the comparison/retrieval can be performed more efficiently and accurately. The embeddings intelligently represent only key information in the sub-queries, and comparison between embeddings can be performed via subtraction, making the comparison more accurate and more efficient. Instead, comparison between two text strings can be significantly more complex, requiring more time and compute to perform.

In the depicted example, the retrieval of similar historical sub-queries can also be based on agent role 118. The agent role 118 comprises information related to the entity that submitted the query (e.g., end user, AI agent), such as the entity's role, department, permission settings, metadata associated with the AI agent, and the like. The data in the cache 120 can be segmented by such information. For example, the system can retrieve from the cache 120 only the historical sub-query data that the entity has access to based on organization rules (e.g., ethical walls). As another example, the system can retrieve from the cache 120 only the historical sub-query data submitted by similar entities (e.g., employees from the same department, with the same title, etc.)

At block 130, if the system determines that a matching historical sub-query is identified in the cache, the system can retrieve the historical sub-response associated with the historical sub-query from the cache as the sub-response for sub-query k. The process can then proceed to block 162 in FIG. 1C, where the sub-responses from all sub-queries 1-n are aggregated, as described herein. The caching of historical sub-queries and historical sub-responses provide several technical advantages. A large volume of identical or similar queries may be submitted by entities in an organization. For example, different accountants in a company may ask for the company's financial information at different times throughout the year. The computational resource needed to process any given query can be significant and the use of external LLMs to obtain a response can be costly. In the process 100, the organization-specific cache 120 leverages historical query and response data to improve the efficiency and quality of query processing. The cache maintains a structured repository of historical queries and their corresponding responses, along with rich metadata such as timestamps, user identifiers, and applied rule sets. If a highly similar query is found, the system can directly return the associated response from the cache, bypassing the need to invoke an external language model. This not only reduces the latency and cost of query processing but also ensures a consistent and accurate response for recurring or similar queries, thus resulting in an improvement in the functioning of the computer system in terms of accuracy, performance, resource utilization, and scalability.

At block 130, if the system determines that the cache 120 does not store a matching historical sub-query, the process 100 proceeds to block 132. At block 132, the system can enhance the sub-query based on the data in the cache 120. In some embodiments, the system inputs the sub-query k into a cache-based enhancement machine-learning model, which is configured to generate an enhanced sub-query. The model can be trained based on historical data in the cache 120. As discussed above, the cache 120 can store historical sub-query and sub-response data. While a large set of the historical sub-queries may be directed to the same question (e.g., all asking for financial performance of a company for a particular year), some of these historical sub-queries may have more details than others. Accordingly, the model can be trained to enrich an input sub-query with information often associated with or relevant to the input-query based on historical query data. The inputs into the cache-based enhancement model can include a given sub-query (e.g., a text string, an embedding), historical query data from the cache 120 (e.g., top N semantically similar historical query-answer pairs from cache), metadata associated with the historical query data including tokens, user role, department, organization, trust level, success/failure indicators, or any combination thereof. The cache-based enhancement model can be configured to output an enhanced or reformulated query.

The enhancement model can be trained using the original queries and the improved versions of the same queries that produced better results. In some embodiments, the training data can further include the resulting quality differentials from the answers. The system may also fine-tune the models based on human evaluations to help select which reformulations produced better answers. The model can be optimized for metrics like answer correctness, completeness and relevance.

In some embodiments, the cache-based enhancement model may comprise a large language model or a small language model such as Phi-4, T5, BART, or the like. In some embodiments, multiple specialized models for each aspect of enhancement can be combined.

In one exemplary implementation, the cache-based enhancement model is configured to leverage historical query data through a multi-step process combining embedding-based similarity retrieval and semantic evaluation. First, the system can use an embedding model to convert all historical question-answer pairs into vector representations stored in a vector database. When a new query arrives, it is converted to the same vector space, and then the system can retrieve semantically similar historical question/answer pairs through vector similarity search. The system can have two filtering options that reject candidates that fall below a similarity threshold and then another that uses a small language model to evaluate if the retrieved content is truly relevant. The small language model can analyze patterns in successful vs unsuccessful historical queries, identify potential pitfalls in the current query by comparing them to historical patterns, reformulate the question to avoid rule issues. New questions and their answers are added to the database, creating a continuously improving system as more examples are collected. The combination of vector retrieval and language model assessments creates a robust system that is more than simple text matching but understands the semantic relationships between queries.

With reference to FIG. 1B, the process 100 further comprises an augmentation layer 133, which includes blocks 134-140, for further enhancing the sub-query k using a knowledge base 142 associated with the organization. The knowledge base 142 comprises one or more databases storing proprietary information related to the organization, such as financial information, customer information, intellectual property, human resources data, strategic plans, legal documents, and the like. The knowledge base 142 may be segmented by departments or other boundaries within the organization, such as ethical walls, to prevent unauthorized access of such information.

At block 134, the system determines whether the sub-query k is organization-specific. An organization-specific sub-query is a sub-query for information about the organization, its products, services, or other details unique to the organization. If yes, the system may retrieve a list of top matching organization-specific information (e.g., top-k documents in FIG. 1B) with the highest degree of matching or relevance with the sub-query k.

Optionally, to facilitate lookup and retrieval of organization-specific information, the sub-query k is transformed into one or more embeddings 136, which can be generated in a similar manner as described above with reference to block 116. Further, the knowledge base 142 can store embeddings representing information/documents related to the organization, in addition to or instead of storing the raw information/documents. Accordingly, the system can identify embeddings from the knowledge base 142 that best match the embeddings 136 (e.g., embedding similarity metric exceeding a threshold, top n best matching embeddings) and retrieve the corresponding raw information/documents. Storing the embeddings can require significantly less storage. Further, the comparison/retrieval can be performed more efficiently and accurately. The embeddings intelligently represent only key information in the sub-queries, and comparison between embeddings can be performed via subtraction, making the comparison accurate and efficient. Instead, comparison between a sub-query and numerous documents can be significantly more complex, requiring more time and compute to perform.

In the depicted example, the retrieval of organization information/documents can also be based on agent role 138. The agent role 138 may comprise information related to the entity that submitted the query (e.g., end user, AI agent), such as the entity's role, department, permission settings, and the like. In some embodiments, the agent role 138 is the same as the agent role 118. The data in the knowledge base 142 can be segmented by such information. For example, the system can retrieve from the knowledge base 142 only the organization information/documents that the entity has access to based on organization rules (e.g., ethical walls). At block 142, the system can add the retrieved organization information/documents to the sub-query. The system can further enrich the prompt by adding a reference or guidance related to the retrieved organization information/documents (e.g., "follow the same format as the document," "take account of the information in the document").

In some embodiments, the system can further enhance the sub-query by adding information related to the entity that has submitted the query, such as: a role, a title, a department, a place of employment, AI agent metadata, or any combination thereof. The information related to the entity may be agent role 118, agent role 138, or both. The information can include the agent role information as described herein. In some embodiments, the information can be provided by an identity management provider.

At block 144, the system has fully enhanced the sub-query. In some embodiments, the enhancement applied to the sub-query is logged for future analytics and model training.

With reference to FIG. 1C, the process 100 further comprises a routing layer 145, which includes blocks 146-152. At block 146, the system determines whether the sub-query k is safe to publish. If the query contains proprietary information and is not safe to be routed to a public LLM, the system can provide the query to a private LLM in block 152. For example, there could be a situation in government contexts where a specific codeword should be masked but then any context around that masked codeword is sensitive but unclassified; thus, it would make sense to still route to a private model on prem or block the question all together. If the query is safe to publish, the process 100 can proceed to block 148.

At block 148, the system selects a language model from a plurality of candidate language models based on the enhanced sub-query. In some embodiments, the system can input the enhanced sub-query into a query classifier. The query classifier may comprise a language model trained based on one or more routing rules such as natural-language rules provided by an administrator of the organization.

In some embodiments, the query classifier comprises an SLM such as gpt-4o-mini model, Phil-4, or the like. The query classifier can be configured to take any query and create a call to the selected small language model with a query that includes the instructions imported from the routing rules section of the database. The routing rules ensure a given sub-query is routed to the LLM that can answer the question most correctly. The natural-language rules can specify how to route a query (e.g., "I want financial queries to go to Anthropic"). In some embodiments, the rules can specify different types of queries, such as general public information queries, public legal queries, public web search queries, public science and technology queries, public marketing queries, private queries, and the like. The rules can further specify various language models for routing these different types of queries, such as OpenAI, Anthropic, Gemini, Deepseek, self-hosting Llama, language models trained using data specific to a given domain (e.g., medical knowledge LLM), and the like. The model can receive the query and provide an output indicative of the language model selected (e.g., an identifier). Accordingly, the router layer 145 intelligently selects the most suitable language model based on factors such as query complexity, domain specificity, and organizational preferences. The system seamlessly integrates with the APIs of the selected language model provider, abstracting away the complexities of different API formats and authentication mechanisms. This allows organizations to leverage the power of multiple language models through a single, unified interface, without the need to manage individual integrations and API calls.

At block 160, a sub-response to the sub-query k is obtained from block 150, block 152, or the organization-specific cache 120. The other sub-queries in the query 102 may be processed in a similar manner as described with reference to the sub-query k. Accordingly, the system can obtain sub-responses 1-n corresponding to sub-queries 1-n. At block 162, the system can compose a response 164 to the query 102 based on the sub-responses 1-n. In some embodiments, the system can combine the sub-responses 1-n by inputting them into a language model (e.g., small language model, large language model) that is configured to aggregate the sub-responses into a coherent narration and/or incorporate additional insight, synthetization, summary, paraphrasing, and/or reasoning based on the sub-responses.

In some embodiments, the system can log the query processing flow, including the original query 102, tokenized representation, applied rules, cache interactions, knowledge base interactions, routing decisions, and the final response 164. This comprehensive logging enables organizations to maintain a complete audit trail of all language model interactions, facilitating compliance, debugging, and performance analysis. The logged data can be easily exported and integrated with existing analytics and reporting tools, providing valuable insights into usage patterns, performance metrics, and areas for improvement.

In some embodiments, the system can store the sub-queries and the sub-responses as additional historical data (e.g., data pair) in the cache 120 associated with the organization, enhancing the ability to handle similar requests in the future. The cache can enable incremental updates and scalability to handle large volumes of historical data. The system can retrain any models used in the process 100 based on the cache iteratively over time, including company-specific small language models 122 and company-specific private LLMs 124 (e.g., those used in block 152). In some embodiments, the cache is used to retrain the enhancement machine-learning models (cache-based, agent-role-based, knowledge-base-based), the query decomposition model, the query classifier, the response composer, and the like. Accordingly, the cache can become richer over time with enhanced historical query data and the corresponding responses, thus supporting retraining of the machine-learning models to be more intelligent.

In some embodiments, the system can provide a plugin architecture that allows organizations to integrate custom components and functionalities. This includes the ability to develop and deploy custom tokenizers, rule engines, caches, and knowledge base backends tailored to specific domain requirements. The plugin architecture enables seamless integration of the system with existing organization systems, such as content management systems, customer support platforms, and data analytics tools.

Figure 2:
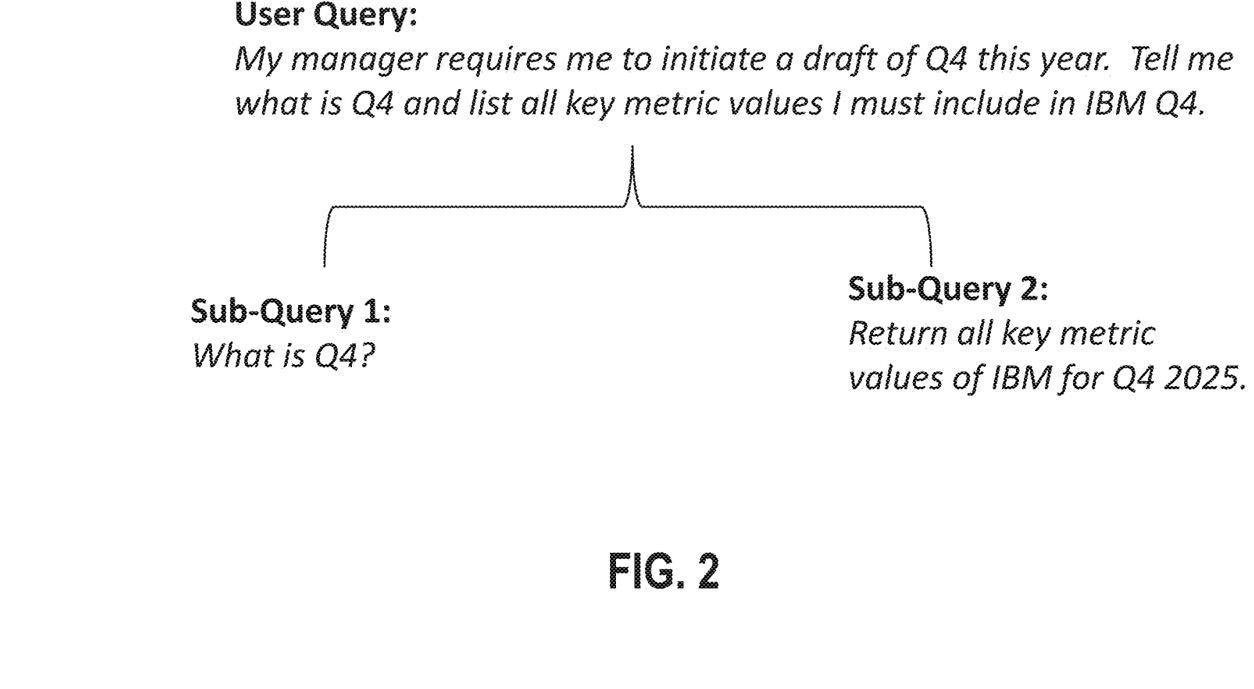
FIG. 2 illustrates exemplary query decomposition results, in accordance with some embodiments.

FIG. 2 illustrates exemplary query decomposition results, in accordance with some embodiments. In the depicted example, the user query is "My manager requires me to initiate a draft of Q4 this year. Tell me what is Q4 and list all key metric values I must include in IBM Q4." The user query may be the user query 102 described in FIG. 1A. The system can generate two sub-queries. The first sub-query is "What is Q4?" and the second sub-query is "Return all key metric values of IBM for Q4 2025." Each sub-query is a sentimental subcomponent of the original user query representing a single demand of knowledge. Accordingly, demand of summation of all sub-queries can result in the demand of original user query, and the summation of sub-responses to the sub-queries can result in the response to the original user query. In some embodiments, a sub-query is the minimum sentimental unit, i.e., it cannot be broken down anymore. Decomposing a user query into sub-queries allow the sub-queries to be enhanced and processed differently (e.g., private v. public LLMs, different public LLMs), thus enhancing the effectiveness of the system. For example, the first sub-query may be provided to a public LLM, while the second sub-query may be provided to a private, organization-specific LLM.

Figure 3:
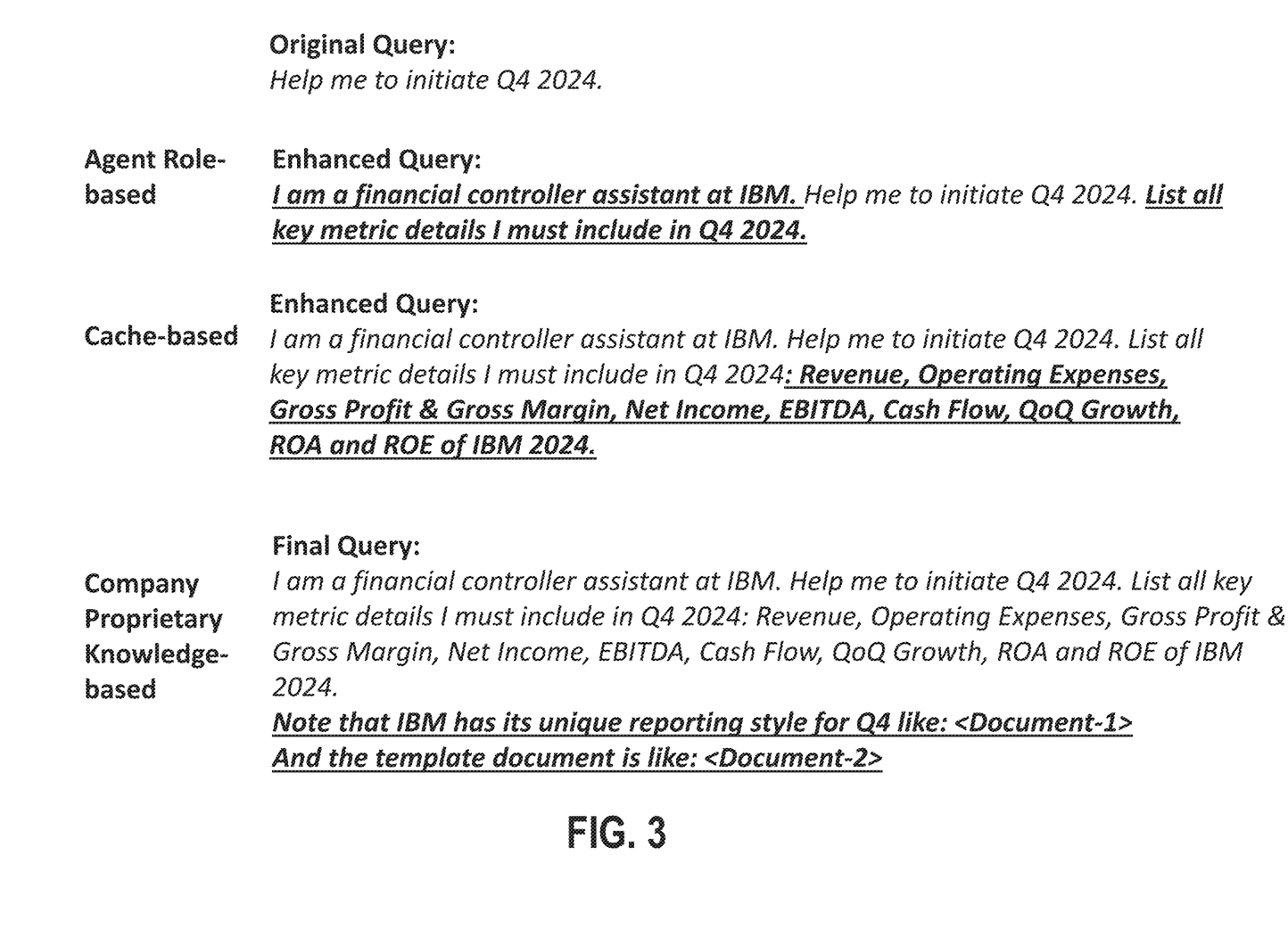
FIG. 3 illustrates various enhancement techniques for queries and sub-queries, in accordance with some embodiments.

FIG. 3 illustrates various enhancement techniques for queries and sub-queries, in accordance with some embodiments. In the depicted example, the original query is "Help me to initiate Q4 2024."

The system can enhance the query based on the agent role. Specifically, the system can enhance the sub-query by adding information related to the entity that has submitted the query, such as: a role, a title, a department, a place of employment, AI agent metadata, or any combination thereof. In some embodiments, the information can be provided by an identity management provider. In the depicted example, the system adds the role of the end user ("I am a financial controller assistant at IBM.") and details that is relevant to the role of the end user ("List all key metric details I must include in Q4 2024.")

The system can further enhance the query based on the organization-specific cache (e.g., cache 120 in FIG. 1B). In the depicted example, the system adds additional details to the query based on the historical query information stored in the cache. The system can further enhance the query based on the knowledge base (e.g., knowledge base 142 in FIG. 1B). In the depicted example, the system adds additional documents to the query based on documents retrieved from the knowledge base, as well as adding guidance related to the documents in the prompt ("Note that IBM has its unique reporting style for Q4," "And the template document is like").

Accordingly, embodiments of the present disclosure provide a system and method for secure cross-platform orchestration and knowledge management of language models. The system can act as a middleware layer between user-facing applications and LLM APIs, enabling organizations to define and enforce query routing rules, sensitive keyword restrictions, and logging functionalities across multiple LLM providers.

In some embodiments, the system includes an API gateway, which provides a unified interface for user applications to interact with the system, handling authentication, rate limiting, and query forwarding to the appropriate LLM based on defined rules. The system can further include a rules engine, which allows administrators to define rules for query routing and sensitive data restrictions. The engine can match incoming queries against these rules to determine the appropriate LLM to use and to filter out restricted keywords before forwarding the query. The system can further include a cache, which can maintain a dynamic repository of user queries and system responses, which is continuously updated as users interact with the AI agents. The cache can utilize vectorization techniques, such as TF-IDF or N-grams, to determine the similarity between the stored information and incoming queries. This can allow the system to provide relevant responses directly from the knowledge base, reducing the need for external API calls and associated costs. The system can further include a model manager, which can handle the integration and management of multiple LLM providers. The model manager can maintain the necessary API connections and credentials, forward queries to the selected LLM, and retrieve the responses.

The system may record all user queries, system responses, and rule-based actions in a secure log for auditing and analysis purposes. This component can enable organizations to monitor the usage of AI agents, detect potential security breaches, and gain insights into the performance and effectiveness of the system. In some embodiments, the logged data is used to retrain the enhancement machine-learning models (cache-based, agent-role-based, knowledge-base-based), the query decomposition model, the query classifier, the response composer, and the like.

Figure 4:
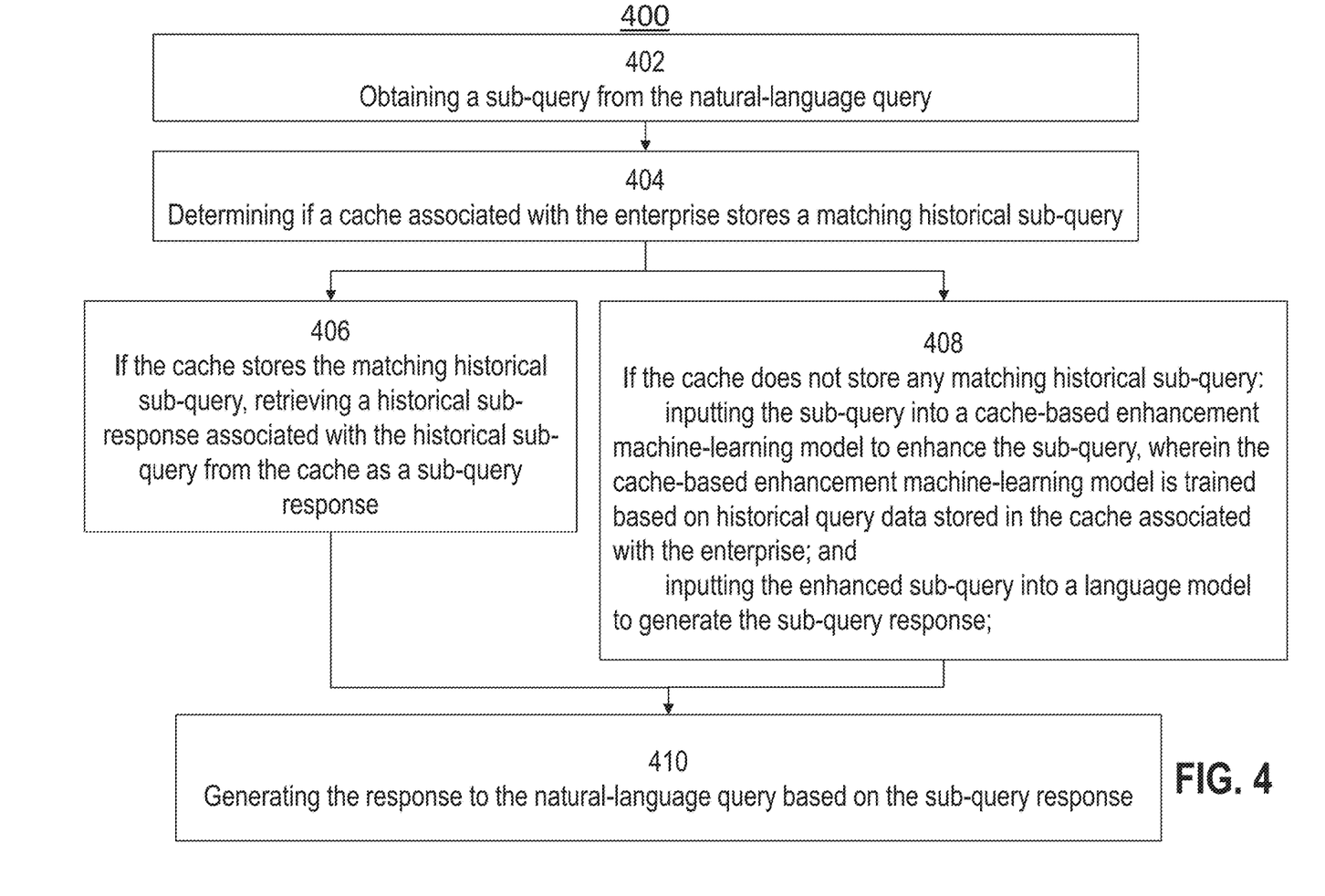
FIG. 4 illustrates an exemplary process for generating a response to a natural-language query from an entity associated with an organization, in accordance with some embodiments.
Figure 5:
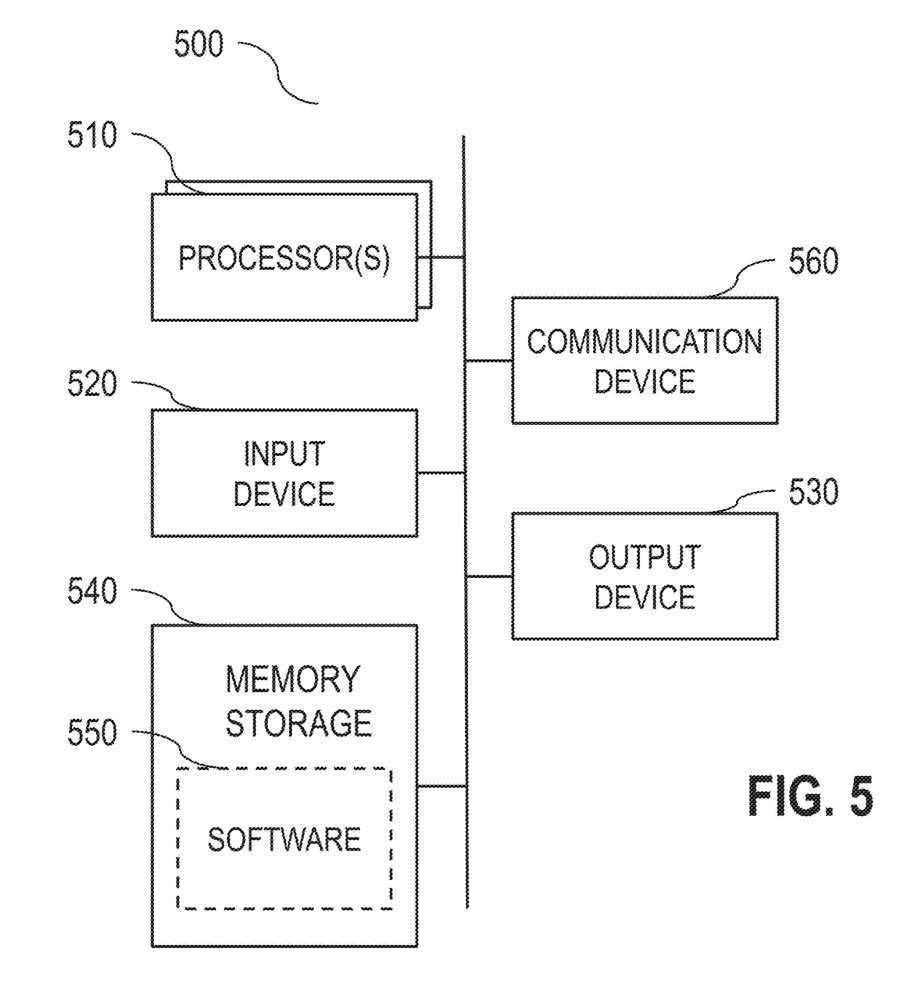
FIG. 5 illustrates an exemplary electronic device, in accordance with some embodiments.

FIG. 4 illustrates an exemplary process 400 for generating a response to a natural-language query from an entity associated with an organization, in accordance with some embodiments. At block 402, the system obtains a sub-query from the natural-language query. At block 404, the system determines if a cache associated with the organization stores a matching historical sub-query. At block 406, if the cache stores the matching historical sub-query, the system a historical sub-response associated with the historical sub-query from the cache as a sub-query response. At block 408, if the cache does not store any matching historical sub-query: the system inputs the sub-query into a cache-based enhancement machine-learning model to enhance the sub-query, wherein the cache-based enhancement machine-learning model is trained based on historical query data stored in the cache associated with the organization; and inputs the enhanced sub-query into a language model to generate the sub-query response. At block 410, the system generates the response to the natural-language query based on the sub-query response The operations described above are optionally implemented by components depicted in FIG. 5. FIG. 5 illustrates an example of a computing device in accordance with one embodiment. Device 500 can be a host computer connected to a network. Device 500 can be a client computer or a server. As shown in FIG. 5, device 500 can be any suitable type of microprocessor-based device, such as a personal computer, workstation, server or handheld computing device (portable electronic device) such as a phone or tablet. The device can include, for example, one or more of processor 510, input device 520, output device 530, storage 540, and communication device 560. Input device 520 and output device 530 can generally correspond to those described above, and can either be connectable or integrated with the computer.

Input device 520 can be any suitable device that provides input, such as a touch screen, keyboard or keypad, mouse, or voice-recognition device. Output device 530 can be any suitable device that provides output, such as a touch screen, haptics device, or speaker.

Storage 540 can be any suitable device that provides storage, such as an electrical, magnetic or optical memory including a RAM, cache, hard drive, or removable storage disk. Communication device 560 can include any suitable device capable of transmitting and receiving signals over a network, such as a network interface chip or device. The components of the computer can be connected in any suitable manner, such as via a physical bus or wirelessly.

Software 550, which can be stored in storage 540 and executed by processor 510, can include, for example, the programming that embodies the functionality of the present disclosure (e.g., as embodied in the devices as described above).

Software 550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 550 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A machine-learning-based method for generating a response to a natural-language query from an entity associated with an organization, comprising:
   obtaining a sub-query from the natural-language query;
   determining if a cache associated with the organization stores a matching historical sub-query:
      if the cache stores the matching historical sub-query, retrieving a historical sub-response associated with the historical sub-query from the cache as a sub-query response;
      if the cache does not store any matching historical sub-query:
         inputting the sub-query into a cache-based enhancement machine-learning model to enhance the sub-query, wherein the cache-based enhancement machine-learning model is trained based on historical query data stored in the cache associated with the organization; and
         inputting the enhanced sub-query into a language model to generate the sub-query response; and
   generating the response to the natural-language query based on the sub-query response.

2. The method of claim 1, further comprising: storing the sub-query and the sub-query response as additional historical data in the cache associated with the organization.

3. The method of claim 2, further comprising: retraining the cache-based enhancement machine-learning model based on at least partially the additional historical data in the cache.

4. The method of claim 2, further comprising: training one or more organization-specific large language models based on at least partially the additional historical data in the cache.

5. The method of claim 1, further comprising:
   receiving the natural-language query;
   checking, based on one or more organization-specific rules, whether the natural-language query is permissible; and
   if the natural-language query is not permissible, foregoing generating the response to a natural-language query.

6. The method of claim 5, further comprising:
   checking, based on the one or more organization-specific rules, if the natural-language query includes sensitive information; and
   if the natural-language query contains sensitive information, masking the sensitive information in the natural-language query.

7. The method of claim 1, further comprising:
   decomposing, using a query decomposition machine-learning model, the natural-language query into a plurality of sub-queries.

8. The method of claim 7, wherein the query decomposition machine-learning model comprises a small language model.

9. The method of claim 7, wherein generating the response to the natural-language query comprises combining a plurality of sub-query responses corresponding to the plurality of sub-queries.

10. The method of claim 1, wherein determining if the cache associated with the organization stores a matching historical sub-query comprises: retrieving one or more candidate historical sub-queries from the cache based on information related to the entity.

11. The method of claim 1, further comprising: adding information related to the entity to the sub-query.

12. The method of claim 11, wherein the information related to the entity comprises: a role, a title, a department, a place of employment, or any combination thereof.

13. The method of claim 1, further comprising: adding information related to the organization to the sub-query.

14. The method of claim 13, wherein the information related to the organization comprises one or more documents from a confidential knowledge base associated with the organization.

15. The method of claim 1, further comprising: selecting the language model from a plurality of candidate language models based on the enhanced sub-query.

16. The method of claim 15, wherein selecting the language model from the plurality of candidate language models comprises:
   inputting the enhanced sub-query into a query classifier.

17. The method of claim 16, wherein the query classifier is a small language model.

18. The method of claim 16, wherein the query classifier is trained based on one or more natural-language rules provided by an administrator of the organization.

19. A system for generating a response to a natural-language query from an entity associated with an organization, comprising:
   one or more processors;
   a memory; and
   one or more programs, wherein the one or more programs are stored in the memory and configured to be executed by the one or more processors, the one or more programs including instructions for:
   obtaining a sub-query from the natural-language query;
   determining if a cache associated with the organization stores a matching historical sub-query:
      if the cache stores the matching historical sub-query, retrieving a historical sub-response associated with the historical sub-query from the cache as a sub-query response;
      if the cache does not store any matching historical sub-query:
         inputting the sub-query into a cache-based enhancement machine-learning model to enhance the sub-query, wherein the cache-based enhancement machine-learning model is trained based on historical query data stored in the cache associated with the organization; and
         inputting the enhanced sub-query into a language model to generate the sub-query response; and
   generating the response to the natural-language query based on the sub-query response.

20. A non-transitory computer-readable storage medium storing one or more programs, the one or more programs comprising instructions, which when executed by one or more processors of one or more electronic devices, cause the one or more electronic devices to:
- obtain a sub-query from the natural-language query;
- determine if a cache associated with the organization stores a matching historical sub-query:
  - if the cache stores the matching historical sub-query, retrieving a historical sub-response associated with the historical sub-query from the cache as a sub-query response;
  - if the cache does not store any matching historical sub-query:
    - input the sub-query into a cache-based enhancement machine-learning model to enhance the sub-query, wherein the cache-based enhancement machine-learning model is trained based on historical query data stored in the cache associated with the organization; and
    - input the enhanced sub-query into a language model to generate the sub-query response; and
- generate the response to the natural-language query based on the sub-query response.

* * * * *